SR
FIP8102 XR 3,870,959

United States Patent [19]
Wootton

[11] 3,870,959
[45] Mar. 11, 1975

[54] DUAL FREQUENCY TRANSMITTER SYSTEM

[75] Inventor: Thomas S. Wootton, Mabelvale, Ark.

[73] Assignee: Baldwin Electronics, Inc., Little Rock, Ark.

[22] Filed: Oct. 24, 1972

[21] Appl. No.: 300,132

[52] U.S. Cl. .................................. 325/156, 331/55
[51] Int. Cl. ............................................ H04b 1/02
[58] Field of Search ........... 325/150, 105, 151, 154, 325/155, 156, 144, 159, 187, 182; 331/55, 158; 332/38; 307/305, 264

[56] References Cited

UNITED STATES PATENTS

| | | | |
|---|---|---|---|
| 2,514,863 | 7/1950 | Han Chett, Jr. | 325/150 |
| 2,534,073 | 12/1950 | Sherwood et al. | 325/151 |
| 2,693,500 | 11/1954 | Cooper | 332/38 |
| 2,738,424 | 3/1956 | Mortley | 331/55 |
| 3,252,154 | 5/1966 | McKee et al. | 325/105 |
| 3,365,675 | 1/1968 | Gaddy et al. | 325/151 |

*Primary Examiner*—Benedict V. Safourek
*Assistant Examiner*—Jin F. Ng
*Attorney, Agent, or Firm*—Hyman Hurvitz

[57] ABSTRACT

An r.f. transmission system arranged to transmit in bursts of ten seconds followed by spaces of 15 seconds in which two crystal controlled oscillators of diverse frequencies are keyed on and off for the required times, but in which the oscillators are permitted to oscillate only in alternation in response to a flip-flop which changes state each time the oscillators are keyed off, and in which the transmission times of the system are measured by an R.C. circuit and the transmitter turned off if transmission time exceeds 30 seconds, the R.C. circuit being discharged rapidly in response to normally timed cessations of transmission, the outputs of the oscillators being audio modulated and the average modulating current being monitored and caused to turn off transmission in response to excess average modulating current but not in response to occasional excess peaks of modulating current.

9 Claims, 2 Drawing Figures

DUAL FREQUENCY TRANSMITTER SYSTEM

BACKGROUND

In my U.S. Pat. No. 3,689,888, transmissions of time coded pulses occur, which identify satellite transmitting stations and locations within transmitting stations at which events occur, such as fire or burglary, and which require transmission to a remote station. Transmission occurs in on periods of ten seconds followed by off periods of fifteen seconds. It is found occasionally that reception at the remote station of transmission from a satellite station is lost because of detuning of the satellite transmitter such that inadequate signal strength is radiated. To minimize the danger that signals will be missed, in the present system, transmissions from each satellite station occur at two slightly diverse frequencies, decreasing the probability of failure by perhaps 50 percent.

Transmission is licensed by the Federal Communications Commission, at 27. mc., provided that emission does not exceed a predetermined level of power. In the present system excess modulation produces excess power radiated, and accordingly, the modulation level is averaged and on attainment by the average modulation current of a value in excess of that permitted by the Rules of the FCC the transmitter is automatically shut down.

It is possible that, due to detuning or failure of a component, the system will go into uncontrolled oscillation, which does not terminate at the end of a ten-second transmission period and which is not controlled by modulation current. To avoid this contingency the radiated output of the transmitter is timed, and if a transmission continues for more than 30. seconds, transmission is shut down, but the timing cycle is restarted in response to termination of each 10. second burst.

SUMMARY

A dual frequency transmission system having two crystal controlled oscillators which are turned on in alternation, each transmission being followed by a rest period during which no transmission occurs, in which output amplifiers coupled to the oscillators are amplitude modulated by audio frequency pulses, in which excess of average modulating current or excess transmission time indicating a runaway condition of the system causes inhibition of radiation from the system by turning off its modulation amplifier.

DRAWINGS

FIGS. 1A and 1B are a single circuit diagram of a system according to the invention.

DETAILED DESCRIPTION

Figure 1A:
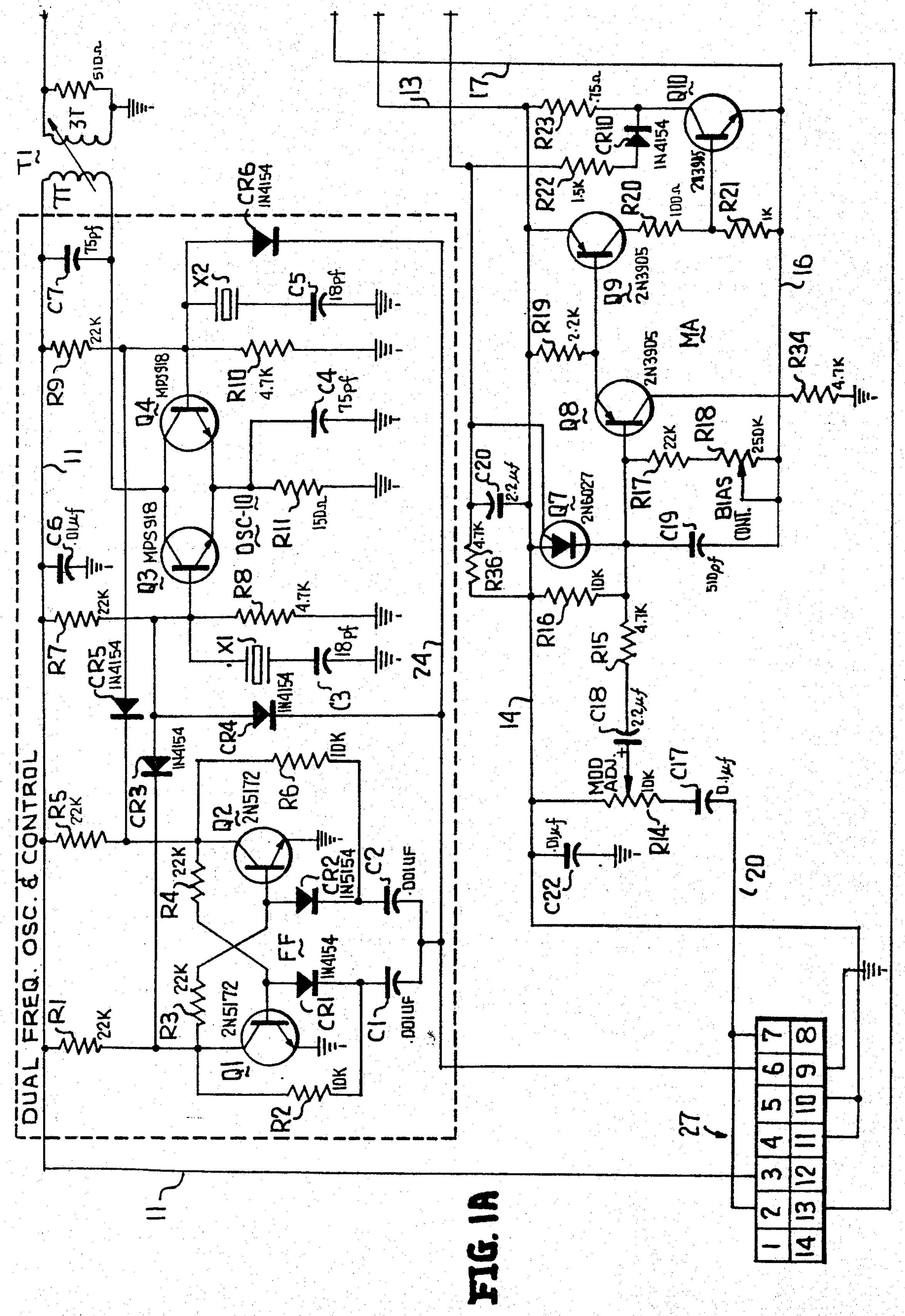
Figure 1B:
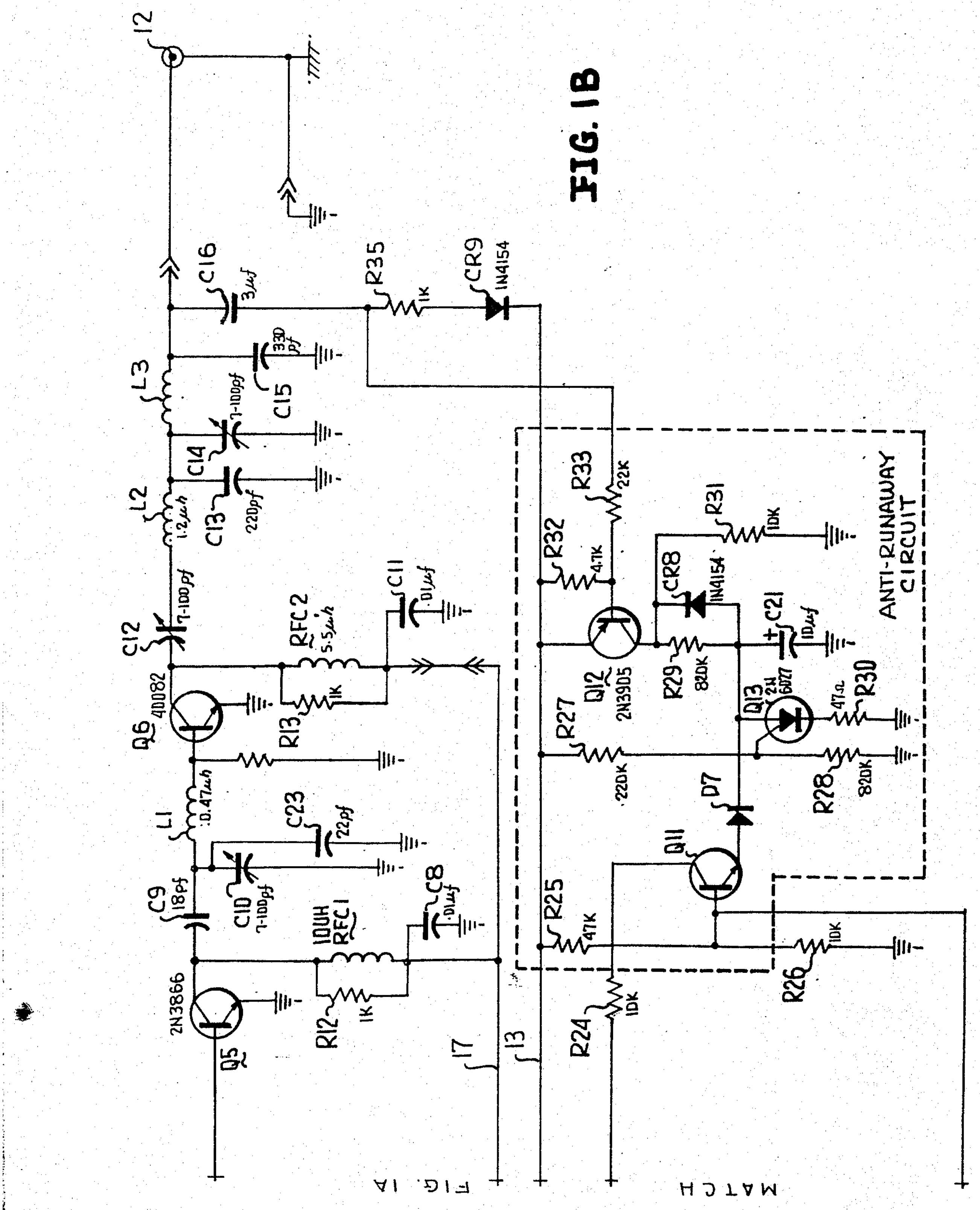

In the single FIGURE of the drawings a dual frequency crystal controlled oscillator 10 includes NPN transistors $Q_3$ and $Q_4$, having their emitters jointly connected to ground via resistance R11, by-passed by capacitor C4, which establishes self-bias. The collectors of the transistors $Q_3$, $Q_4$ are jointly connected via a tank circuit C7, 7T to lead 11 which also serves to carry positive voltage commonly to the collectors of $Q_3$, $Q_4$. 7T is the primary of a transformer T1, the secondary 3T of which drives transistor r.f. amplifier $Q_5$ which is coupled through an impedance matching network consisting of C9, C10 and L1 to the base of transistor r.f. amplifier $Q_6$, which in turn is connected via a matching circuit consisting of L2, C13, C14, L3, to antenna terminal 12. C9 and C12 serve to block d.c.

Supply voltage for $Q_5$ and $Q_6$ is applied from a modulation amplifier MA over line 17. Supply voltage is provided over line 14 to emitter follower $Q_8$, a PNP transistor having resistance R19 connected from line 14 to its emmiter and R34 in its collector circuit, the latter connected to ground. The voltage developed across R19 is applied to the base of PNP transistor $Q_9$, having its emitter connected directly to line 14 and a collector load R20, R21, in series. R21 is connected base to emitter of transistor $Q_{10}$, and the emitter of $Q_{10}$ is connected via lead 17 and resistance R12 and radio frequency choke RFC1, in parallel, to the collector of $Q_5$, and via resistance R13 and r.f. choke RFC2, in parallel, to the collector of $Q_6$. $Q_{10}$ is the output emitter follower of the modulator amplifier MA. The emitter of $Q_{10}$ is also fed back via lead 16 and resistances R17, R18, in series, to the base of $Q_8$ to supply bias current to $Q_8$, so that there exists a closed loop for stabilizing the output applied to the collectors of $Q_5$ and $Q_6$ via lead 17.

Resistance R23 is connected in series with the collector of $Q_{10}$, and serves to sample current flowing through $Q_{10}$. The positive side of R23 is connected to the anode of switch $Q_7$ and to lead 14, while the more negative side is connected via diode CR10 to the gate electrode of $Q_7$. The gate of $Q_7$ is connected through R36, CR10 to the collector of $Q_{10}$ so that if the voltage across R23 is sufficiently high, indicating that current flow into $Q_{10}$ is high, $Q_7$ turns on, which essentially shorts the emitter to base circuit of $Q_8$ and turns that transistor off, which prevents all current flow from modulator MA to transistors $Q_5$ and $Q_6$. The turn on point for $Q_7$ is set at .6 amps in R23 in one embodiment of the invention. However, during modulation, peaks of modulating current may exceed this value, and it is not desired that these transient peaks fire $Q_7$. Accordingly the gate to cathode circuit of $Q_7$ is low pass filtered by R36, C20, and gating is controlled by r.m.s. current.

A.C. modulating current is applied via lead 20, from a source not illustrated, and via capacitors C17, C18 to the base of $Q_8$, C22 being an r.f. bypass for lead 14, and the setting of R14 thus sets the level of the modulation voltage derived from the source, not illustrated.

R.F. output appearing at antenna terminal 12 is tapped via capacitor C16 and rectified by diode CR9 to supply emitter current to $Q_{12}$, the base of $Q_{12}$ being connected to the more positive side of a resistance R35, ac coupled between terminal 12 and the anodes of CR9 by capacitor 16. The emitter of $Q_{12}$ which is a PNP transistor, is directly connected to the cathode of CR9 and the base and emitter of $Q_{12}$ are interconnected by a resistance R32. $Q_{12}$ turns on and charges C21 via R29, whenever transmission occurs. C21 is connected across the anode to cathode circuit of switch $Q_{13}$, which has a gate connected to the junction of R27, R28, connected in series with each other from the cathode of CR9 to ground. A positive voltage established in terms of r.f. voltage thus appears instantaneously at the gate of $Q_{13}$, when transmission commences, while the voltage at its anode slowly increases as C21 charges. When the voltage at the anode exceeds the voltage at the gate, $Q_{13}$ fires, grounding the emitter of $Q_{11}$. The collector of $Q_{11}$ is connected via R24 to the gate of switch $Q_7$, while its base is biassed by the positive voltage at the junction of R25, R26, connected in series from the cathode of CR9 to ground. $Q_{11}$ is normally off, until its emitter is grounded. Upon turning on of switch $Q_{13}$ the emitter of $Q_{11}$ is grounded and it turns on, which grounds the gate of $Q_7$, turns off $Q_7$ and shuts off modulator amplifier MA.

The charging time constant of R29, C21 is such that about 30 seconds is required to effect shut-off. Normally, in the operation of the present system, transmission occurs in successive bursts of about 10 seconds, followed by spaces of about 15 seconds. When the r.f. turns off, C21 sees a discharge path through CR8 and R31, having a relatively short time constant, so that C21 will always discharge completely between bursts of transmission. However, the transmitter control circuit may fail, or the transmitter oscillator 10 may go into uncontrolled self-oscillation, due to presence of a faulty component or mistuning. The circuit comprising switch $Q_{13}$ will then insure that radiation will not continue for more than 30 seconds.

The oscillator 10 comprises two sections one comprising $Q_3$, controlled by piezo-electric crystal $X_1$ and the other comprising $Q_4$ controlled by piezo-electric crystal $X_2$. $X_1$ and $X_2$ are tuned to different frequencies, which are to be transmitted during alternate bursts of transmission. Diodes CR3 and CR4 control $Q_3$ and diodes CR5 and CR6 control $Q_4$. The cathodes of diodes CR4 and CR6 are commonly connected via lead 24, and the anodes connected to the bases of $Q_3$, $Q_4$, respectively, so that if ground is applied to lead 24 both $Q_3$ and $Q_4$ are turned off and no r.f. transmission can occur.

Diodes CR3 and CR5 have anodes connected to the bases of $Q_3$ and $Q_4$ and cathodes connected respectively to the collectors of $Q_1$ and $Q_2$, connected to form a flip-flop FF. Accordingly, when a positive voltage is applied to lead 24, tending to gate both $Q_3$ and $Q_4$ on, either the $Q_3$ oscillator or the $Q_4$ oscillator will oscillate, but not both, since either CR3 cathode or CR5 cathode will be grounded through FF, and the other will be at high positive voltage. The flip-flop FF is symmetrical and changes state each time lead 24 goes to ground. The oscillator is keyed on and off therefore by applying alternately positive and ground voltage to lead 24 from pin 6 of connector 27, connected to a source of keying voltage, not illustrated, and each time that it is turned on changes frequency of transmission.

What is claimed is:

1. A radio transmitter including two diversely tuned oscillators, a source of sequential on-off control signals, a single lead connecting said source of on-off control signals to both said oscillators concurrently, the on signals conditioning both said oscillators for concurrent oscillation and the off signals inhibiting said oscillation of both said oscillators, bistable flip-flop, means responsive to the alternate states of said bistable flip-flop for alternately inhibiting said oscillations of said oscillators in sequence, means connecting said single lead to said flip-flop for applying said on-off signals to said flip-flop, said flip-flop being responsive to said on-off control signals for alternating the states of said flip-flop.

2. The combination according to claim 1, wherein each of said oscillators includes a transistor having a base and wherein a separate piezo-electric crystal is connected between each said base of said transistors and ground, and a common tank circuit connected jointly in series with the collectors of both said transistors.

3. The combination according to claim 2, wherein said on-off signals are alternately high and low voltages, wherein said single lead applies said alternately high and low voltages to said bases to turn said transistors alternately on and off concurrently, said bistable flip-flop having two points of alternately high and low voltage representing said states of said flip-flop, means connecting said points to said bases, respectively, of said transistors, and means for transferring the state of said flip-flop in response to each occurrence of said low voltage on said single lead.

4. A radio transmitter including two diversely tuned oscillators, a source of sequential on-off control signals, a single lead connecting said source of on-off control signals to both said oscillators concurrently, the on signals conditioning both said oscillators for concurrent oscillation and the off signals inhibiting said oscillations, a bistable flip-flop for alternately inhibiting said oscillations of said oscillator in sequence, means connecting said single lead to said flip-flop for applying said on-off signals to said flip-flop, said flip-flop being responsive to said on-off control signals for alternating the states of said flip-flop, a tank circuit connected to said oscillators, a radio frequency amplifier connected in cascade with said tank circuit, a modulator amplifier connected to supply operating current to said radio frequency amplifier, means for maintaining current flow from said modulator amplifier into said radio frequency amplifier means responsive to excess of average value of said current flow with respect to a predetermined value for disabling said modulator amplifier, means for timing the transmission time of said radio frequency amplifier, and means responsive to continuing transmission of radio frequency amplifier for a time interval in excess of a predetermined time interval for disabling said modulator amplifier.

5. The combination according to claim 4, wherein said last means includes a current sampling resistance, a rectifier diode, a timing resistance and a timing capacitor, connected in the order recited between the output of said radio frequency amplifier and ground, a gated diode switch connected across said capacitor, said gated diode switch having a cathode connected to ground, an anode connected to said capacitor and a gate connected to the cathode of said rectifier diode, and wherein the anode of said rectifying diode is connected to control charging of said capacitor.

6. The combination according to claim 4, wherein each of said oscillators includes a transistor and wherein a separate piezo-electric crystal is connected between each base of said transistors and ground, for tuning said oscillators and, wherein said tank circuit is connected jointly in series with the collectors of both said transistors.

7. The combination according to claim 6, wherein said on-off signals are alternately high and low voltages, wherein said single lead connects said alternately high and low voltages to said bases to turn said transistors alternately on and off concurrently, said bistable flip-flop having two points of alternately high and low voltage representing said states of said flip-flop, means connecting said points to said bases, respectively, of said transistors, and means for transferring the state of said flip-flop in response to each occurrence of said low voltage on said single lead.

8. A radio transmitter including an r.f. oscillator, an r.f. amplifier connected in cascade with said r.f. oscillator, a modulator amplifier connected to said r.f. amplifier to provide bursts of modulating signal to said r.f. amplifier, a gate controlled diode connected to inhibit said modulating signal when fired, means for measuring average modulating current during each of said bursts supplied by said modulator amplifier, and means responsive to a level of said modulating current in excess of a predetermined value as measured by said means for measuring for applying between the gate and anode of said gate controlled diode a voltage selected to fire said gate controlled diode.

9. A radio transmitter according to claim 8, wherein is further provided means for measuring times of transmission of said r.f. amplifier, said last means including a rectifier connected to rectify the output of said r.f. amplifier, and an integrator including timing capacitor connected in series with said rectifier, means responsive to attainment of a predetermined voltage across said capacitor for firing said gate controlled diode, and means responsive to termination of each of said bursts for rapidly discharging said capacitor.

* * * * *